United States Patent Office 3,761,288
Patented Sept. 25, 1973

3,761,288
METHOD FOR MAKING A LOW CALORIE SWEETENING COMPOSITION
Martin Glicksman, Valley Cottage, and Bartley N. Wankier, White Plains, N.Y., assignors to General Foods Corporation, White Plains, N.Y.
No Drawing. Filed July 16, 1970, Ser. No. 55,561
Int. Cl. A23l *1/26*
U.S. Cl. 99—141 A                           7 Claims

ABSTRACT OF THE DISCLOSURE

Readily soluble, sweetening compositions are produced by co-drying solutions of an edible bulking agent and a dipeptide sweetening compound.

BACKGROUND OF THE INVENTION

This invention relates to a readily soluble sweetening composition containing an edible bulking agent and a dipeptide sweetening agent and more particularly to a low bulk density sweetening composition which in appearance and behavior is similar to ordinary, granulated sucrose but which possesses a bulk density and caloric value per unit of volume considerably less than that of sucrose.

Previous attempts to produce artificial sweeteners have involved the use of saccharins and/or cyclamates. Problems have arisen with the use of these compounds, however, since the saccharins leaves a somewhat bitter aftertaste in the mouth and the cyclamates are now excluded from commercial food products as hazardous to human health.

It has recently been found that certain dipeptide compounds possess an intense sweetness level. Examples of these compounds are set forth in U.S. Pat. Nos. 3,475,403 and 3,492,131. Most suitable among these compounds are the lower alkyl esters of aspartylphenylalanine wherein the stereochemical configuration is L—L, DL—DL, DL—L or L—DL. Illustrative of the lower alkyl esters are methyl, ethyl, propyl, butyl, pentyl, hexyl, heptyl and the branched chain groups isometric therewith, with the methyl ester being the most preferred embodiment.

These dipeptide materials would appear to have great commercial applications as sweetening agents since they range up to 200 times the sweetness level of sucrose, have no discernible unpleasant aftertaste, and can be produced from naturally occurring amino acids. Problems have arisen, however, with the use of these compounds in that their rate of solution into water is markedly slower than sucrose, and that the compounds tend to decompose, losing substantially all their sweetness upon heating at temperatures above about 80° C.

SUMMARY OF THE INVENTION

It has now been found that the rate of solution of dipeptide sweetening compounds can be significantly increased by co-drying an aqueous solution of an edible builking agent and the dipeptide sweetening compound. It has also been found that, surprisingly, these aqueous solutions may be dried, such as by drum drying and spray drying, at conditions of elevated temperatures (i.e., above 100° C. without significant adverse effects on the sweetening level of the dipeptide compounds.

The solid edible bulking agents suitable for use in this invention may be any of the non-toxic substances or combination of substances heretofore employed by the prior art for this purpose including the organic acids such as citric, adipic, fumaric acids, and the hydrolyzed starch materials such as dextrins and sugars. Especially suitable among these solid bulking agents are the dextrins of the class commonly known as corn syrup solids, since with certain of these materials it is possible to produce a low calorie, low bulk density, non-hygroscopic sweetening composition which has the appearance of table sugar and which will dissolve readily in cold water.

It is an object of this invention to produce a low-calorie substitute for granulated sucrose.

It is a further object of this invention to produce a dipeptide-containing, low-calorie sweetening composition which has a rate of solution comparable to that of sucrose.

DESCRIPTION OF THE INVENTION

According to one embodiment of this invention a table sugar substitute having the appearance of crystalline sucrose may be prepared by forming a uniform aqueous solution of a corn syrup dextrin material and a dipeptide sweetening agent and drying this solution in a manner so as to yield an expanded product which may then, if necessary, be ground to size. Such drying methods as drum drying, spray drying and freeze drying have been found suitable for producing these table sugar substitutes.

The dextrin material used for the production of these sugar substitutes must dissolve easily in water to produce a clear solution and must be non-hygroscopic. In this regard the D.E. (dextrose equivalent) of the dextrin material has been found to be a critical parameter. The dextrin material must have a sufficiently low molecular weight to be easily soluble in water and to produce a clear solution so that the final product will have the essential reflecting surfaces in order to give the appearance of a crystalline product. On the other hand the molecular weight of the dextrin material must be high enough so that hygroscopicity is avoided.

Accordingly, it has been determined that for the production of table sugar substitutes the dextrin material should have a D.E. in the range of about 4 to 20 and preferably in the range of about 5 to 10. Additionally it has been found that the best results are obtained if the dextrin material contains little or no monosaccharide (i.e. glucose) and contains an irregular distribution of the other lower (one to eight saccharide units) saccharides with a preponderance of the hexamer and heptamer. Such corn syrup dextrins have been produced by means of enzymatic hydrolysis of starch and are typified by the products available from CPC under the name Mor-Rex.

The processes of this invention are further illustrated but not limited by the following examples:

Example 1

Three grams of citric acid and one gram of L-aspartyl-L-phenylalanine methyl ester are dissolved in 50 ml. of water with stirring. The resulting solution is spread on a stainless steel tray (2.1 sq. ft.) and allowed to dry at ambient conditions for about two days. The dry material was then scraped from the tray and ground with a mortar and pestle. One-half gram samples of this ground material were added with stirring, to beakers containing 200 ml. of water at 40° F. The material completely dissolved in an average time of about 55 seconds yielding solutions which were sweet with a slight acid taste.

Example 2

A solution was prepared containing 800 grams of water (80° F.), 241 grams of 5 D.E. Mor-Rex and 5.95 grams of L-aspartyl-L-phenyl-alanine methyl ester. This solution was placed in a tray at a 1.5 inch thickness and freeze dried in a Stokes Freeze Drier for 48 hours. The material was then ground to a fine powder using a Waring blender at a high speed.

Example 3

A solution was prepared according to the method of Example 2 and this solution was drum dried at a temperature of 130° C. on a drier operating at 25 lbs./sq. in. and 6.25 r.p.m.'s.

Example 4

A solution containing 384.05 grams of water, 241 grams of 5 D.E. Mor-Rex and 5.95 grams of L-aspartyl-L-phenylalanine methyl ester was prepared. This solution was then spray dried in a Niro Spray Dryer at an air pressure of 5.2 kg./sq. cm., an air inlet temperature of 160° C., an air outlet temperature of 75° C. and a rate of solution flow of 15 cc./min.

Equal weight samples of the sweetening compositions of Examples 2, 3 and 4 were dissolved in coffee samples and were organoleptically determined to have substantially equivalent sweetness levels. This sweetness level is not found to significantly differ from control coffee samples containing an equal amount of the untreated dipeptide material, thus indicating the absence of any degradation of the dipeptide material during the drying operations.

The solubility rate of the powders from Examples 2, 3 and 4 was evaluated by recording the times required for complete solution of 1.5 gram samples of these powders (containing about 0.036 gram of sweetener) into 170 ml. of water at a temperature of 40° F., with stirring.

The results are summarized in the table below.

| | 40° F. (time in seconds) |
|---|---|
| Example 2 | 62 |
| Example 3 | 40 |
| Example 4 | 60 |

When 0.036 gram samples of L-aspartyl-L-phenylalanine methyl ester are sought to be dissolved in 170 ml. of water at 40° F., with stirring, average times for complete solution run about 30 minutes.

Additional tests have shown that varying the level of dipeptide in the sweetening compositions up to the level of about one part dipeptide per part of bulking agent, does not have any appreciable or predictable effect on the rate of solution. All samples prepared in accordance with this invention were found to dissolve in water as cold as 40° F. in less than 2 minutes, whereas complete solution of equivalent amounts of the dipeptide material taken alone requires a time of about 30 minutes.

It has also been found that the elevated temperatures, in excess of 100° C., which are employed during the spray drying and drum drying operation do not affect the sweetness of the final product.

The bulk density of the final sweetening composition can be controlled by varying the solids concentration of the solution prior to drying. The bulk density may also be controlled by changing the method of drying, by varying the rate of drying, or by varying the conditions of pressure or vacuum under which the solution is dried. Bulk densities ranging as low as about 0.04 g./cc. can be obtained by the process of the instant invention.

The addition of a small amount of an anti-caking agent such as tricalcium phosphate may also be used to adjust the bulk density of the final product.

Thus by exercising proper control over the process it is possible to produce a final product which has substantially the same bulk density of granulated sucrose or a product which has a much lower bulk density than granulated sucrose but which by adjusting the level of dipeptide sweetening compound, has on a volume basis the same level of sweetness as sucrose but a far less caloric value.

Example 5

A sweetening composition which has on a volume basis the same sweetening power of sucrose is prepared by spray drying a 50% solids solution containing 96.5%, 10 D.E. Mor-Rex and 3.5% L-aspartyl-L-phenylalanine. The drier was equipped with a single 1/1TC Whirljet nozzle and was operating with a spray pressure of 500 to 700 p.s.i.g., an inlet air temperature of 400° F., an air flow of 2800 cu. ft./min., an air outlet temperature of 245° F. and a feed temperature of 155° F. The spray dried powder was screened through a 16 U.S. mesh screen and blended with 0.1% by weight of tricalcium phosphate. The resultant product has a bulk density of 0.14 g./cc., has a crystalline appearance, has on a volume basis, the same level of sweetness as granulated table sugar and dissolves rapidly in 40° F. water.

It will be apparent that there are variations and modifications of this invention and that the proportions, ingredients and typical operating conditions may be varied without departing from the scope of the invention.

Having thus described the invention, what is claimed is:

1. A method for producing a readily soluble sweetening composition comprising the steps of forming an aqueous solution of an edible bulking agent and a dipeptide sweetening compound, said bulking agent being selected from the group consisting of organic acids, hydrolyzed starch materials and sugars, said dipeptide being a lower alkyl ester of aspartylphenylalanine, and said aqueous solution containing less than about one part dipeptide per part of bulking agent, and drying the solution at conditions of elevated temperature above 100° C.

2. The method according to claim 1 wherein the bulking agent is corn syrup solids having a dextrose equivalent within the range of about 4 to 20.

3. The method of claim 1 wherein the bulking agent is an organic acid.

4. The method of claim 3 wherein the acid is citric acid.

5. The method according to claim 1 wherein the sweetening compound is L-aspartyl-L-phenyl-alanine methyl ester.

6. The method according to claim 5 wherein the drying is drum-drying.

7. The method according to claim 5 wherein the drying is spray-drying.

References Cited
UNITED STATES PATENTS

| | | | |
|---|---|---|---|
| 3,492,131 | 1/1970 | Schlatter | 99—141 |
| 3,475,403 | 10/1969 | Mazur | 260—112.5 |
| 3,325,296 | 6/1967 | Braaten | 99—141 |
| 3,170,801 | 2/1965 | McNaught | 99—141 |

RAYMOND N. JONES, Primary Examiner